(12) United States Patent
Ryoki et al.

(10) Patent No.: US 11,592,329 B2
(45) Date of Patent: Feb. 28, 2023

(54) PHOTOELECTRIC CONVERSION APPARATUS, PHOTOELECTRIC CONVERSION SYSTEM, MOVING BODY, AND TESTING METHOD OF PHOTOELECTRIC CONVERSION APPARATUS

(71) Applicant: CANON KABUSHIKI KAISHA, Tokyo (JP)

(72) Inventors: Tatsuya Ryoki, Kanagawa (JP); Yukihiro Kuroda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 202 days.

(21) Appl. No.: 17/067,073

(22) Filed: Oct. 9, 2020

(65) Prior Publication Data
US 2021/0123802 A1 Apr. 29, 2021

(30) Foreign Application Priority Data

Oct. 25, 2019 (JP) .............................. JP2019-194804

(51) Int. Cl.
*G01J 1/44* (2006.01)

(52) U.S. Cl.
CPC ......... *G01J 1/44* (2013.01); *G01J 2001/4466* (2013.01)

(58) Field of Classification Search
CPC ........................... G01J 1/44; G01J 2001/4466
See application file for complete search history.

(56) References Cited

U.S. PATENT DOCUMENTS 5,054,911 A * 10/1991 Ohishi ................ G01B 11/026
356/5.07
2019/0252557 A1 8/2019 Kuroda
2019/0305030 A1 10/2019 Maehashi

FOREIGN PATENT DOCUMENTS

JP 2019-9768 A 1/2019

* cited by examiner

*Primary Examiner* — Georgia Y Epps
*Assistant Examiner* — Don J Williams
(74) *Attorney, Agent, or Firm* — Canon U.S.A., Inc. IP Division

(57) ABSTRACT

A photoelectric conversion apparatus includes a waveform shaping circuit, a reference circuit, and a counter. The waveform shaping circuit is configured to generate a first pulse signal based on a signal output from an avalanche diode. The reference circuit is configured to generate a second pulse signal without depending on incident light. The counter is connected to the waveform shaping circuit and the reference circuit to count a number of occurrences of a pulse signal. The pulse signal is based on at least one of the first pulse signal and the second pulse signal, and is input to the counter.

19 Claims, 9 Drawing Sheets

PHOTOELECTRIC CONVERSION APPARATUS, PHOTOELECTRIC CONVERSION SYSTEM, MOVING BODY, AND TESTING METHOD OF PHOTOELECTRIC CONVERSION APPARATUS

BACKGROUND

Field

The present disclosure relates to a photoelectric conversion apparatus, a photoelectric conversion system, a moving body, and a testing method of the photoelectric conversion apparatus.

Description of the Related Art

There has been known a photoelectric conversion apparatus including a photoelectric conversion unit that executes avalanche multiplication.

A photoelectric conversion apparatus discussed in Japanese Patent Application Laid-Open No. 2019-9768 generates wave pulses by multiplying electrons generated when photons are incident on the photoelectric conversion unit through avalanche multiplication. It is possible to count the number of photons incident on the photoelectric conversion unit by counting the wave pulses using a counter.

In Japanese Patent Application Laid-Open No. 2019-9768, a configuration for testing the photoelectric conversion apparatus is not considered.

SUMMARY

The present disclosure is directed to a configuration, a system, and a testing method capable of testing a photoelectric conversion apparatus including an avalanche diode.

According to an aspect of the present disclosure, a photoelectric conversion apparatus includes an avalanche diode, a waveform shaping circuit, a reference circuit, and a counter. The avalanche diode is configured to generate avalanche multiplication based on incident light. The waveform shaping circuit is configured to generate a first pulse signal based on a signal output from the avalanche diode. The reference circuit is configured to generate a second pulse signal without depending on the incident light. The counter is connected to the waveform shaping circuit and the reference circuit to count a number of occurrences of a pulse signal, wherein the pulse signal is based on at least one of the first pulse signal and the second pulse signal, and is input to the counter.

According to another aspect of the present disclosure, a photoelectric conversion apparatus includes an avalanche diode, a waveform shaping circuit, a reference circuit, and a counter. The avalanche diode is configured to generate avalanche multiplication based on incident light. The waveform shaping circuit is configured to generate a first pulse signal based on a signal output from the avalanche diode. The reference circuit is configured to generate a second pulse signal without depending on the incident light. The counter is configured to count the first pulse signal and the second pulse signal.

According to yet another aspect of the present disclosure, a testing method of a photoelectric conversion apparatus includes counting a second pulse signal which does not depend on incident light by the counter, and testing whether the photoelectric conversion apparatus is normal by comparing a digital signal acquired by the counter counting the second pulse signal with an expectation value. The photoelectric conversion apparatus includes an avalanche diode, a waveform shaping circuit, and a counter. The avalanche diode is configured to generate avalanche multiplication based on incident light. The waveform shaping circuit is configured to generate a first pulse signal based on a signal output from the avalanche diode. The counter is configured to count a number of occurrences of the first pulse signal.

Further features of the present disclosure will become apparent from the following description of exemplary embodiments with reference to the attached drawings.

DESCRIPTION OF THE EMBODIMENTS

Hereinafter, exemplary embodiments will be described with reference to the appended drawings.

In the below-described exemplary embodiments, an image capturing apparatus will be mainly described as an example of a photoelectric conversion apparatus. However, the photoelectric conversion apparatus is not limited to the image capturing apparatus, and the exemplary embodiments are also applicable to the other examples of the photoelectric conversion apparatus. For example, a range finding apparatus which measures a distance by a focus detection method or a time-of-flight (TOF) method and a photometric apparatus which measures an amount of incident light are given as the examples of the photoelectric conversion apparatus.

Further, a conductivity type of a transistor described in the below-described exemplary embodiments is merely an example, and a conductivity type of the transistor is not limited to the conductivity type described in the exemplary embodiments. The conductivity type described in the exemplary embodiments can be changed as appropriate, and a gate, a source and a drain of the transistor can be also changed as appropriate along with the change of the conductivity type.

For example, in a case where a transistor operates as a switch, according to the change of the conductivity type, a low level and a high level of the potential supplied to a gate are inverted with respect to those of the potential described in the exemplary embodiment. Further, a conductivity type of a semiconductor region described in the below-described exemplary embodiments is merely an example, and not limited to the type described in the exemplary embodiments. The conductivity type described in the exemplary embodiments can be changed as appropriate, and potential of the semiconductor region can be also changed as appropriate according to the change of the conductivity type.

Figure 1:
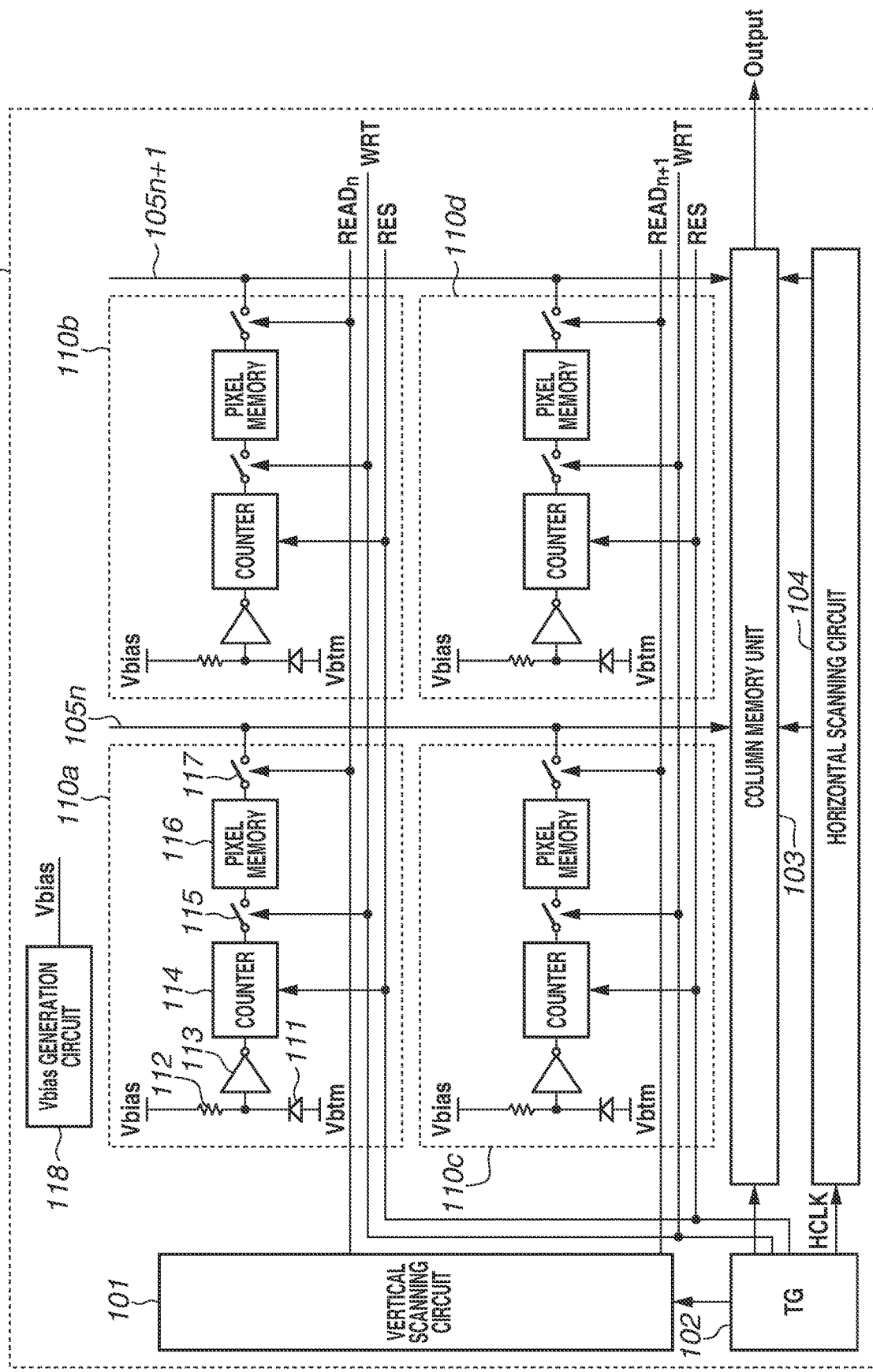
FIG. 1 is a diagram illustrating an example of a configuration of a photoelectric conversion apparatus according to a first exemplary embodiment.

An image capturing apparatus according to a first exemplary embodiment will be described with reference to FIGS. 1, 2, and 3. FIG. 1 is a block diagram illustrating an image capturing apparatus according to the present exemplary embodiment.

As illustrated in FIG. 1, an image capturing apparatus 100 according to the present exemplary embodiment includes a vertical scanning circuit 101, a timing generator (TG) 102, a column memory unit 103, and a horizontal scanning circuit 104. The image capturing apparatus 100 further includes a plurality of pixel circuits 110 arranged in a matrix form. In FIG. 1, four pixel circuits 110a, 110b, 110c, and 110d are illustrated for the sake of simplicity. As another example, the image capturing apparatus 100 may include many more pixel circuits 110. For example, the pixel circuits 110 can be arranged in thousands of rows and columns.

The TG 102 is a control circuit for generating a signal for controlling each of the units of the image capturing apparatus 100. The TG 102 supplies various control signals to the vertical scanning circuit 101 and the column memory unit 103. Further, the TG 102 supplies a control signal HCLK to the horizontal scanning circuit 104. The TG 102 also supplies a transfer control signal WRT and a reset control signal RES to each of the pixel circuits 110.

Each of the pixel circuits 110 includes an avalanche diode (hereinafter referred to as "AVD") 111, a quench element 112, an inverter 113 as an example of a waveform shaping circuit, a counter 114, a transfer switch 115, a pixel memory 116, and a row selection switch 117.

One of the nodes of the quench element 112 is connected to the AVD 111, and the other node thereof is connected to a Vbias node. A bias voltage higher than a breakdown voltage of the AVD 111 is applied to the AVD 111 from the Vbias node via the quench element 112. With this configuration, an avalanche multiplication phenomenon occurs when a photon is incident on the AVD 111. In other words, the AVD 111 is operated in a Geiger mode when a bias voltage is supplied thereto from the Vbias node. The Geiger mode is a mode in which an applied voltage higher than the breakdown voltage is applied to the AVD.

When an avalanche current is generated by the avalanche multiplication phenomenon, a voltage drop occurs in the quench element 112, so that a cathode potential of the AVD 111 is lowered. When the cathode potential is equal to or lower than a breakdown voltage of the AVD 111, the avalanche multiplication phenomenon is stopped. As a result, a flow of avalanche current is stopped, and a bias voltage supplied from the Vbias node is applied to the cathode of the AVD 111. The quench element 112 is a resistive element for stopping the avalanche multiplication phenomenon that has occurred in the AVD 111. This resistive element may be configured of a metal-oxide semiconductor (MOS) transistor or a conductive film such as a polysilicon film.

For example, a bias voltage of the Vbias node can be approximately +20 V although the bias voltage is not limited thereto. For example, an anode of the AVD 111 may be connected to a negative potential. In other words, as described above, a potential difference between the anode and the cathode only need to be a voltage greater than the breakdown voltage. In the present exemplary embodiment, the voltage is thus set to 20 V or greater.

In the above configuration, the bias voltage is generated by a Vbias generation circuit 118. The Vbias generation circuit 118 is arranged on the outside of the image capturing apparatus 100. In other words, the bias voltage is supplied thereto from the outside of the image capturing apparatus 100. However, the bias voltage may be generated inside the image capturing apparatus 100.

The cathode of the AVD 111 is connected to an input node of the inverter 113. When the avalanche multiplication phenomenon occurs due to a photon incident on the AVD 111, a potential of the cathode of the AVD 111 is lowered (i.e., avalanche operation). An output of the inverter 113 is changed due to the lowered potential of the cathode. Specifically, in a stationary state, the bias voltage supplied from the Vbias node is applied to the input node of the inverter 113. Then, due to a current (hereinafter referred to as "avalanche current") generated by avalanche multiplication, the potential of the cathode is lowered to be less than or equal to the threshold value of the inverter 113. As a result, an output of the inverter 113 is changed. Due to the lowered potential of the cathode, a potential difference between the anode and the cathode becomes less than the breakdown voltage, so that the AVD 111 is shifted to a non-Geiger mode. As a result, the avalanche current does not flow in the AVD 111. Thereafter, because of the bias voltage supplied from the Vbias node and a current supplied from the quench element 112, the potential of the cathode of the AVD 111 gradually returns to the bias voltage (i.e., return operation). Accordingly, an output of the inverter 113 is changed again. In such a manner, the avalanche operation and the return operation are executed repeatedly in the AVD 111. Further, the inverter 113 generates a pulse signal based on a potential of the input node, i.e., based on change of the potential of the cathode of the AVD 111. In other words, the inverter 113 serves as a waveform shaping circuit that converts the potential of the cathode of the AVD 111 to a pulse signal. As used herein, a pulse signal generated by the inverter 113 based on a photon incident on the AVD 111 is called a "first pulse signal".

The counter 114 counts the number of occurrences of pulses of the pulse signal output from the inverter 113. For example, a bit width (i.e., bit count) of the counter 114 is 16. An upper limit of the count value of the counter 114 having the bit width of 16 is 65535 in decimal notation. A reset control signal RES is input to the counter 114 from the TG 102. The count value of the counter 114 is reset by the reset control signal RES. The counter 114 counts the first pulse signal for a predetermined period. With this operation, a count value corresponding to the number of photons incident on the AVD 111 in the predetermined period can be acquired as a digital signal.

The transfer switch 115 is controlled by a transfer control signal WRT output from the TG 102. The transfer switch 115 is turned ON when the transfer control signal WRT is at a high level. With this operation, the digital signal retained by the counter 114 is transferred to the pixel memory 116. Because the pixel circuit 110 includes the pixel memory 116, the counter 114 can execute counting operation in a period when a digital signal is being read from the pixel memory 116 of each row through scanning operation. With this configuration, a high frame rate can be achieved. It is also possible to execute a global shutter without having a dead period in which counting operation cannot be executed. In a case where the pixel memory 116 is not arranged thereon, next counting operation cannot be executed until reading operation of the digital signal retained by the counter 114 is ended. Therefore, when the global shutter is executed, a dead period needs to be provided so that the counting operation is held in a stand-by state until operation for reading the digital signals from the counters 114 of all of the pixel circuits 110 is ended. However, because the pixel memory 116 is arranged on the pixel circuit 110, the counter 114 can execute next counting operation without waiting for completion of the reading operation of the digital signals from the pixel circuits 110. Therefore, the global shutter can be realized without providing a dead period.

A reading control line READ arranged in each row of pixel circuits 110 is connected to the vertical scanning circuit 101.

The reading control line READ controls the row selection switch 117. The row selection switch 117 is turned ON when the reading control line READ is at a high level. The digital signal is accordingly read from the pixel memory 116 and transmitted to a vertical signal line 105. Through vertical scanning executed by the vertical scanning circuit 101, the digital signal is sequentially read out in each row of pixel circuits 110. In addition, the number of rows to be selected does not always have to be one. For example, in a case where a plurality of vertical signal lines 105 is arranged with respect to one column of pixel circuits 110, a plurality of rows can be selected simultaneously.

In FIG. 1, the vertical signal line 105 is simply illustrated by a single line representing a bus for transferring a digital signal. In a case where the digital signal is read from the pixel memory 116 for parallel transfer, the vertical signal lines 105 need to be arranged by the number corresponding to the bit widths of the counter 114 and the pixel memory 116. For example, when the bit width of the counter 114 is 16-bit, 16 pieces of each of the vertical signal lines 105n and 105n+1 are arranged thereon. In a case where the digital signal is read from the pixel memory 116 for serial transfer, the vertical signal line 105 can be configured of a single signal line. Further, even in a case where the digital signal is read for parallel transfer, the number of vertical signal lines 105 does not have to be sixteen if the digital signals are read from the pixel memories 116 divided into a plurality of groups.

A plurality of vertical signal lines 105 is connected to the column memory unit 103. In order to describe each of the signal lines, two vertical signal lines 105n and 105n+1 will be used from among the plurality of vertical signal lines 105. The vertical signal lines 105n and 105n+1 are both connected to the column memory unit 103. The column memory unit 103 retains pixel signal values of respective columns read out from the pixel circuits 110.

Based on the control signal HCLK received from the TG 102, the horizontal scanning circuit 104 sequentially outputs the digital signals of respective columns retained in the column memory unit 103 via an output line Output.

Through the above-described operation, the pixel circuit 110 generates a digital signal based on incident light, and the digital signal is read out from the pixel circuit 110. As used herein, this operation for generating and reading a digital signal based on incident light is called a "regular operation".

Next, operation executed in a testing mode of the pixel circuit 110 according to the present exemplary embodiment will be described.

As described above, when a potential difference between the cathode and the anode of the AVD 111 is equal to or lower than the breakdown voltage, the AVD 111 is shifted to a non-Geiger mode. In the testing mode, the Vbias generation circuit 118 outputs a pulse signal oscillating at a voltage greater than the threshold value of the inverter 113, at which the AVD 111 is shifted to a non-Geiger mode. As used herein, this pulse signal output from the Vbias generation circuit 118 in the testing mode is called "second pulse signal". In addition, the Vbias generation circuit 118 which outputs the second pulse signal is a reference circuit which outputs the second pulse signal as a pulse signal without depending on incident light. A clock pulse is input to the Vbias generation circuit 118 from a clock pulse generation unit (not illustrated). The Vbias generation circuit 118 generates the second pulse signal by using this clock pulse. A frequency of the second pulse signal may conform to a frequency of the clock pulse or a frequency corresponding to the divided frequency of the clock pulse. Further, the TG 102 may supply the clock pulse to the Vbias generation circuit 118. In the present exemplary embodiment, the second pulse signal is a wave pulse repeated by a single frequency. However, the configuration is not limited to the above example, and the frequency of the second pulse signal does not have to be constant.

Based on the pulse signal input to the Vbias node, the inverter 113 repeatedly executes inversion operation, and a count value according to the number of changes of the output of the inverter 113 is written into the counter 114. In other words, a count value (reference digital signal) according to the number of pulses input to the Vbias node is written into the counter 114. Thereafter, similar to the regular operation, the reference digital signal retained by the counter 114 is transferred to the pixel memory 116. Then, vertical scanning similar to that of the regular operation is executed, so that the reference digital signal retained by each of the pixel circuits 110 is sequentially read out through the output line Output.

A comparison circuit arranged on the outside of the image capturing apparatus compares the reference digital signal output from the output line Output with an expectation value of the reference digital signal. The expectation value is a value corresponding to the number of pulses of the second pulse signal counted throughout a period in which the counter 114 counts the number of occurrences of the second pulse signal. With this operation, it is possible to test whether the pixel circuit 110 is operated normally. In addition, the comparison circuit may be arranged inside the image capturing apparatus. In a case where the comparison circuit is arranged inside the image capturing apparatus, the image capturing apparatus is configured as an apparatus which includes a built-in self-test (BIST) mechanism.

Figure 2:
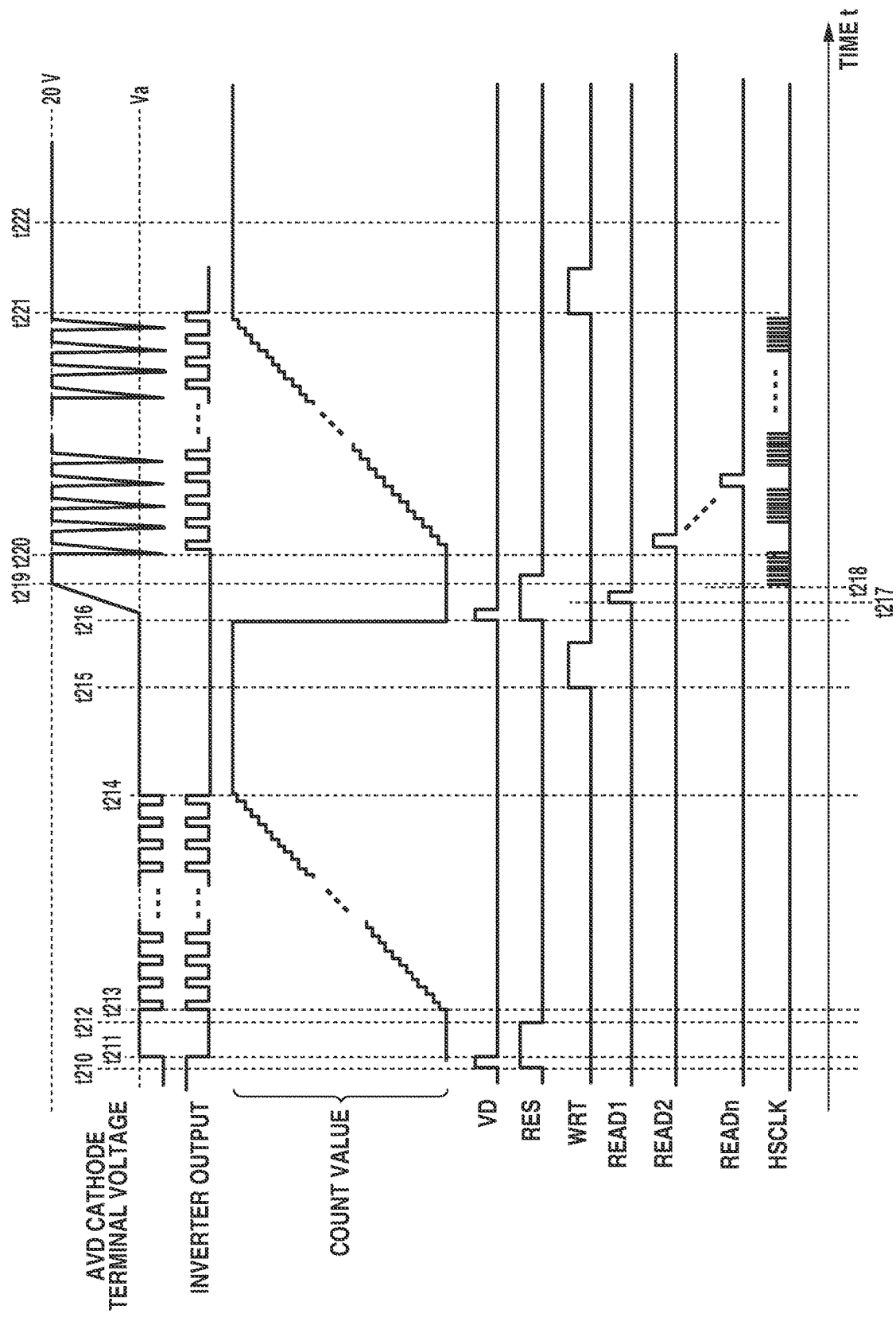
FIG. 2 is a diagram illustrating an example of operation executed by the photoelectric conversion apparatus according to the first exemplary embodiment.
Figure 3:
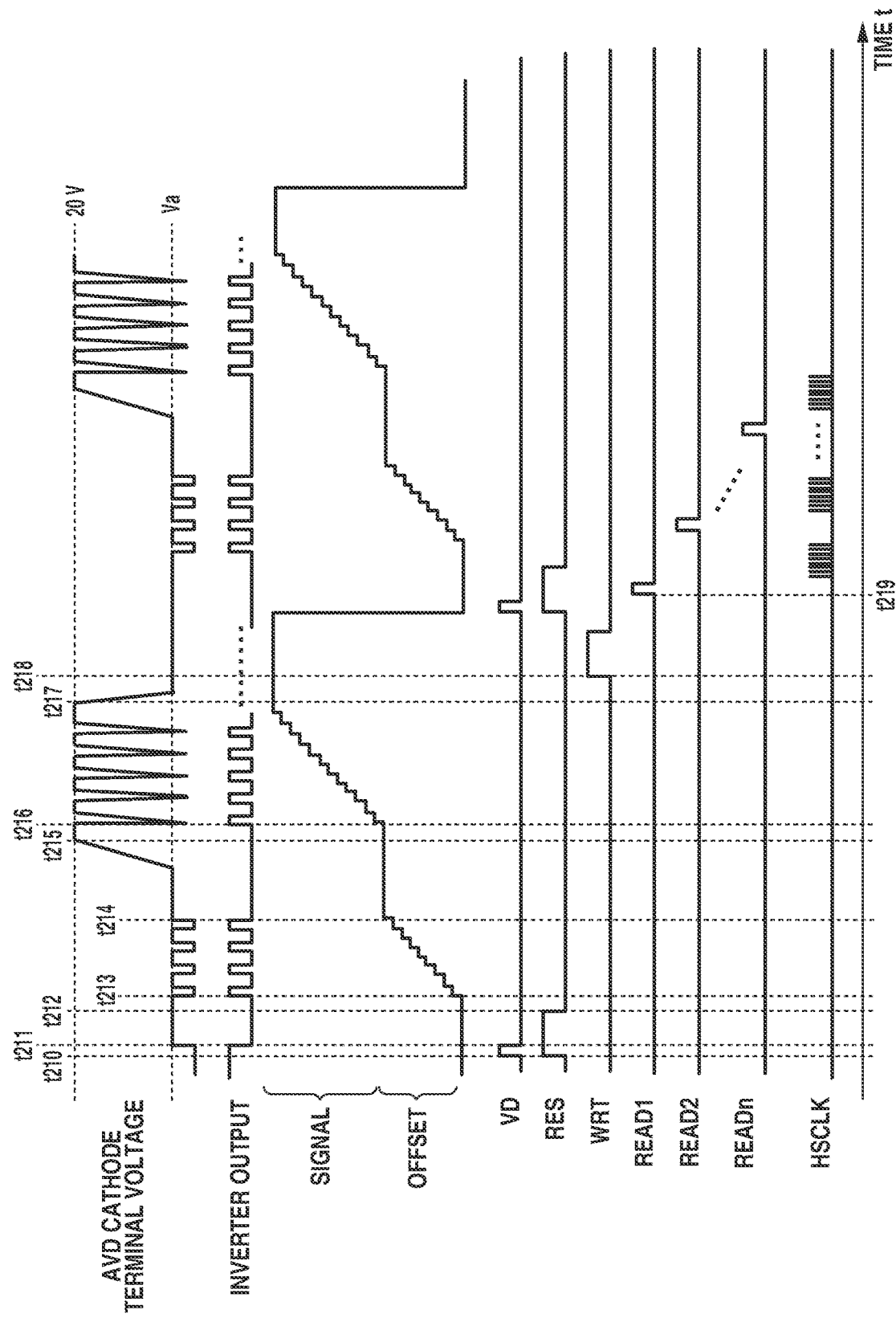
FIG. 3 is a diagram illustrating an example of operation executed by the photoelectric conversion apparatus according to the first exemplary embodiment.

FIG. 2 is a timing chart illustrating details of the operation executed by the image capturing apparatus 100 in the regular operation mode and the testing mode according to the present exemplary embodiment. Herein, the pixel circuit 110a will be described from among the plurality of pixel circuits 110.

In FIG. 2, the operation in the testing mode and the operation corresponding to one frame in the regular operation mode are illustrated. A period from time t210 to time t214 corresponds to a testing period in which testing of the pixel circuit 110 is executed.

On the other hand, a period from time t216 to time t221 corresponds to a regular operation period (also referred to as "light receiving period") in which the regular operation is executed.

First, at time t210, when a synchronization signal VD is at a high level, the TG 102 sets the reset control signal RES to a high level. By setting the reset control signal RES to a high level, the counter 114 is brought into a reset state. In the operation in FIG. 2, all of the pixel circuits 110 are controlled collectively. Therefore, the counters 114 of all of the pixel circuits 110 included in the image capturing apparatus are reset concurrently. A voltage Va is applied to the cathode of the AVD 111 from the Vbias generation circuit 118. Herein, the voltage Va is a voltage greater than or equal to the threshold value of the inverter 113, at which the AVD 111 is shifted to a non-Geiger mode.

At time t212, when the reset control signal RES is set to a low level, the counter 114 is released from the reset state. With this configuration, the counters 114 of all of the pixel circuits 110 are brought into a state (enable state) where counting can be started.

From time t213, the Vbias node is driven by pulses at a voltage within a range from a ground voltage to the voltage Va. When the Vbias node is driven by pulses, the output of the inverter 113 is changed repeatedly according to the change of potential of the Vbias node. The counter 114 generates a count value according to the number of changes of the output of the inverter 113. A period from time t213 to time t214, when the Vbias node is driven by pulses, is a writing period in which a test count value (reference digital signal) is written into the counter 114.

At time t215, the TG 102 sets the transfer control signal WRT to a high level. When the transfer control signal is at a high level, the transfer switch 115 is turned ON. Therefore, the test count value (reference digital signal) at time t215 is written into the pixel memory 116.

The reference signal written into the pixel memory 116 is read out through the following operation.

First, at time t217, the vertical scanning circuit 101 sets a reading control signal READ1 to a high level. With this operation, the row selection switch 117 of the pixel circuit 110 arranged on the first row is turned ON. Therefore, the value retained by the pixel memory 116 is written into the column memory unit 103 via the vertical signal line 105 connected to the corresponding pixel circuit 110.

Subsequently, reading control signals READ2 to READn are sequentially controlled by the vertical scanning circuit 101. Through the above control, the reference digital signal is sequentially output for each row by vertical scanning From time t218, the horizontal scanning circuit 104 executes horizontal scanning on the plurality of column memory units 103 based on the control signal HCLK received from the TG 102. With this operation, the test count value (reference digital signal) written into each of the pixel circuits 110 according to the number of pulses of the second pulse signal is output to the comparison circuit arranged on the outside of the image capturing apparatus 100 via the output line Output. As described above, the comparison circuit compares the reference digital signal output from the pixel circuit 110 with the expectation value. The comparison circuit determines that the pixel circuit 110 is normal when the reference digital signal conforms to the expectation value. On the other hand, in a case where the reference digital signal does not conform to the expectation value, the comparison circuit determines that the pixel circuit 110 is defective. Through the above operation, it is possible to test whether the pixel circuit 110 is normal. Alternatively, the defective pixel circuit 110 may be unusable in the regular operation mode by specifying the address of the pixel circuit 110.

Next, driving executed in the regular operation mode will be described.

When the synchronization signal VD is set to a high level at time t216, the TG 102 sets the reset control signal RES to a high level. By setting the reset control signal RES to a high level, the counter 114 of the pixel circuit 110 is brought into a reset state. Therefore, the reference digital signals retained by the counters 114 of the pixel circuits 110 are reset concurrently.

At time t219, the potential of the Vbias node is increased to 20 V. As a result, the AVD 111 is shifted to a Geiger mode. Therefore, the AVD 111 is brought into a state where a phenomenon of avalanche multiplication can occur when a photon is incident thereon. In the present exemplary embodiment, 20 V is applied as the potential of the Vbias node. However, any voltage at which the AVD 111 can be shifted to a Geiger mode may be applied thereto. Further, a negative voltage may be applied to the anode of the AVD 111.

When the reset control signal RES is at a low level, the counter 114 is released from the reset state and brought into a state where counting can be started.

At time t220, avalanche current is generated when a photon of incident light is incident on the AVD 111. The potential of the cathode of the AVD 111 is lowered because of a voltage drop in the quench element 112. As a result, an output of the inverter 113 is changed. When the avalanche current is stopped, the potential of the cathode of the AVD 111 returns to 20 V according to the bias voltage supplied from the Vbias node via the quench element 112. An output of the inverter 113 is then changed again. Typically, the inverter 113 generates one pulse when one photon is incident on the AVD 111. Thereafter, similar avalanche multiplication operation and return operation are executed repeatedly each time the photon is incident on the AVD 111. The count value of the counter 114 is changed according to the number of pulses generated through the above operations executed repeatedly.

At time t221, when the transfer control signal WRT is at a high level, the transfer switch 115 is turned ON, and the count value at time t221 is written into the pixel memory 116.

Similar to the above-described operation in the testing mode, the vertical scanning circuit 101 sequentially selects a reading row and reads a signal from each of the pixel memories 116. The read signal is transferred to the column memory unit 103 via the vertical signal line 105. Thereafter, through the operation executed by the horizontal scanning circuit 104, the signal is sequentially output via the output line Output.

As described above, according to the present exemplary embodiment, the voltage supplied from the Vbias generation circuit 118 is changed between when the image capturing apparatus 100 operates in the regular operation mode and when the image capturing apparatus 100 operates in the testing mode. In this way, testing of the pixel circuit 110 can be executed without changing the configuration of the pixel circuit 110.

Further, in the present exemplary embodiment, the testing operation and the regular operation are executed in this order. However, the testing operation does not have to be executed constantly, and the testing operation may be executed at the time when the image capturing apparatus 100 is manufactured. Alternatively, the testing operation may be repeatedly executed each time a predetermined operation period has passed.

Further, by using the configuration of the present exemplary embodiment, it is also possible to expand a function of the regular operation of the pixel circuit 110. For example, an offset can be applied to the count value generated in the regular operation mode. An example of the operation for applying the offset is illustrated in FIG. 3.

At time t210, when the synchronization signal VD is at a high level, the TG 102 sets the reset control signal RES to a high level. Therefore, the counter 114 of the pixel circuit 110 is brought into a reset state.

At time t211, the voltage Va is applied to the cathode of the AVD 111 from the Vbias generation circuit 118. Herein, the voltage Va is a voltage greater than or equal to the threshold value of the inverter 113, at which the AVD 111 is shifted to the non-Geyger mode.

At time t212, when the reset control signal RES is at a low level, the counter 114 is released from a reset state and brought into a state (enable state) where the counting operation can be executed.

From time t213, the Vbias node is driven by pulses at a voltage within a range from a ground voltage to the voltage Va. When the Vbias node is driven by pulses, the output of the inverter 113 is changed repeatedly according to the change of the potential of the Vbias node. The counter 114 generates a count value according to the number of changes of the output of the inverter 113. A period from time t213 to time t214, when the Vbias node is driven by pulses, is a writing period in which a test count value (reference digital signal) is written into the counter 114.

At time t215, the potential of the Vbias node is increased to 20 V. As a result, the AVD 111 is shifted to a Geiger mode. Therefore, the AVD 111 is brought into a state where a phenomenon of avalanche multiplication can occur when a photon is incident thereon. In the present exemplary embodiment, 20 V is applied as the potential of the Vbias node. However, any voltage at which the AVD 111 is shifted to a Geiger mode may be applied thereto. Further, a negative voltage may be applied to the anode of the AVD 111.

At time t216, avalanche current is generated when a photon of incident light is incident on the AVD 111. The potential of the cathode of the AVD 111 is lowered because of a voltage drop in the quench element 112. As a result, an output of the inverter 113 is changed. When the avalanche current is stopped, the potential of the cathode of the AVD 111 returns to 20 V because of the bias voltage supplied from the Vbias node via the quench element 112. With this operation, an output of the inverter 113 is changed again. Typically, the inverter 113 generates one pulse when one photon is incident on the AVD 111. Thereafter, similar avalanche multiplication operation and return operation are executed repeatedly each time the photon is incident on the AVD 111. The count value of the counter 114 is changed according to the number of pulses generated through the above operations executed repeatedly.

At time t217, the voltage Va is applied to the Vbias node, so that the AVD 111 is shifted to a non-Geiger mode. A period from time t215 to time t217 is an acquisition period of a digital signal corresponding to incident light.

At time t218, when the transfer control signal WRT is at a high level, the transfer switch 115 is turned ON. Therefore, the count value at time t218 is written into the pixel memory 116. At this time, the written signal is a sum of a known offset signal and a pixel signal.

Similar to the above-described operation, the vertical scanning circuit 101 sequentially selects a reading row and reads a signal from each of the pixel memories 116. Then, the read signal is transferred to the column memory unit 103 via the vertical signal line 105. Thereafter, through the operation executed by the horizontal scanning circuit 104, the signal is sequentially output via the output line Output.

As described above, in the non-Geiger mode in which the avalanche current is not generated, the Vbias node is driven by pulses, so that a predetermined value of offset can be applied to the digital signal based on incident light.

According to the configuration of the present exemplary embodiment, testing can be executed without changing the configuration of the pixel circuit 110. Further, a predetermined offset value can be applied to the digital signal generated in the regular operation mode.

A second exemplary embodiment will be described mainly focusing on differences from the first exemplary embodiment.

Figure 4:
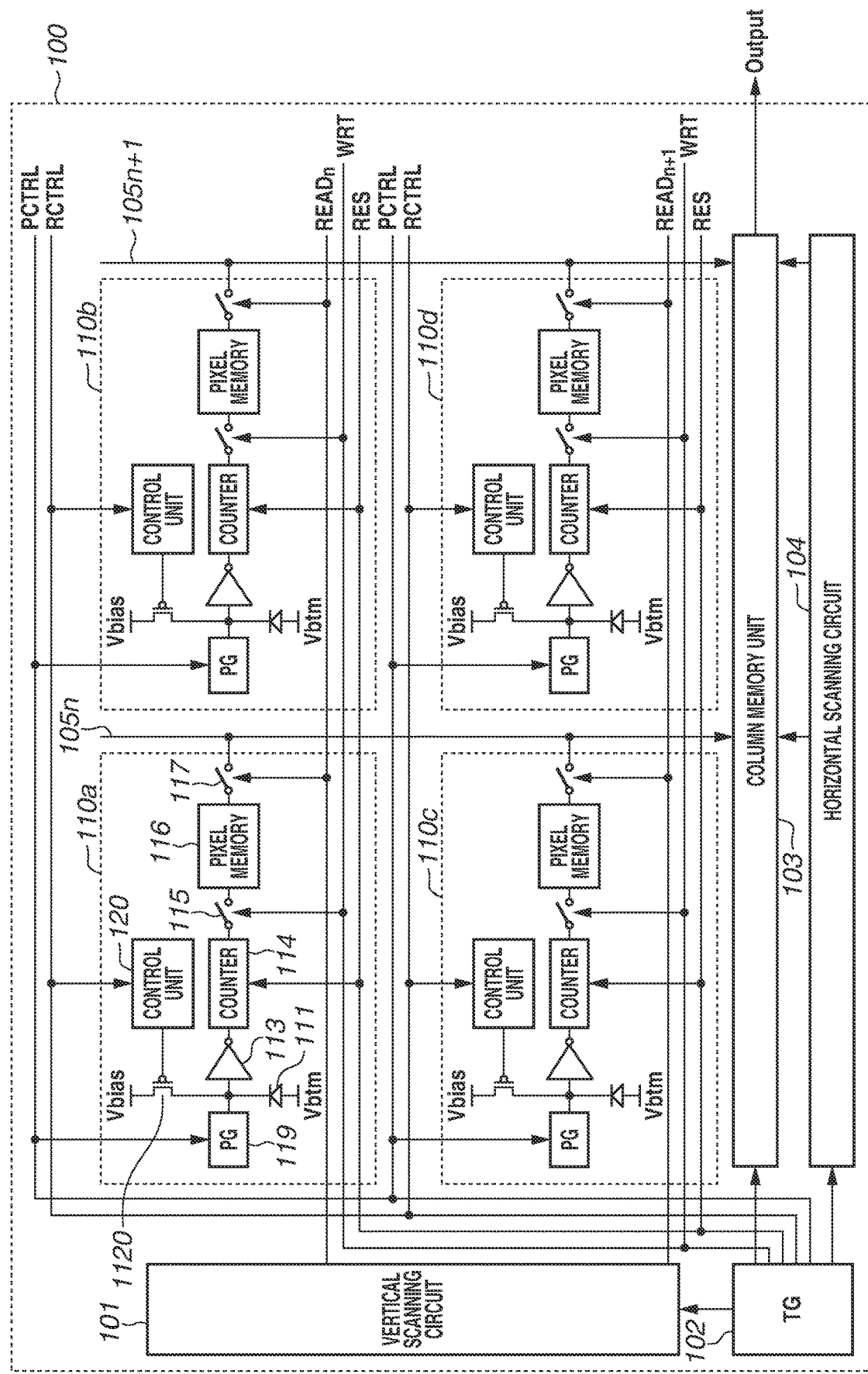
FIG. 4 is a diagram illustrating an example of a configuration of a photoelectric conversion apparatus according to a second exemplary embodiment.

FIG. 4 is a diagram illustrating a configuration of an image capturing apparatus as one example of the photoelectric conversion apparatus of the present exemplary embodiment.

Each of the pixel circuits 110 includes a P-channel metal oxide semiconductor (PMOS) transistor 1120 as a quench element and a quench control unit 120 connected to a gate of the PMOS transistor 1120. A quench control unit 120 included in each of the pixel circuits 110 is connected to the TG 102.

Further, each of the pixel circuits 110 includes a pulse generation circuit 119. In FIG. 4, the pulse generation circuit is described as a pulse generator (PG) 119. Hereinafter, the pulse generation circuit 119 is also expressed as "PG 119". In the present exemplary embodiment, the pulse generation circuit 119 is a reference circuit which outputs the second pulse signal as a pulse signal without depending on incident light.

The PG 119 included in the pixel circuit 110 is controlled by a control signal PCTRL output from the TG 102. When the control signal PCTRL is at a high level, the PG 119 outputs a pulse signal (second pulse signal) without depending on incident light. The pulse signal output from the PG 119 is input to the input node of the inverter 113. When the control signal PCTRL is at a low level, impedance of the output of the PG 119 becomes high, so that output of the second pulse signal is stopped. Further, the PG 119 included in the pixel circuit 110 generates the second pulse signal by using a clock pulse (not illustrated) supplied from the TG 102. In addition, a frequency of the second pulse signal may conform to a frequency of the clock pulse or a frequency corresponding to a predetermined divided frequency of the clock pulse.

The quench control unit 120 included in the pixel circuit 110 is controlled by a control signal RCTRL output from the TG 102. A resistance value between the source and the drain of the PMOS transistor 1120 is controlled by the control signal RCTRL. When the control signal RCTRL is at a low level, the PMOS transistor 1120 functions as a quench element. On the other hand, when the control signal RCTRL is at a high level, impedance between the source and the drain becomes high, so that the PMOS transistor 1120 is turned OFF.

Figure 5:
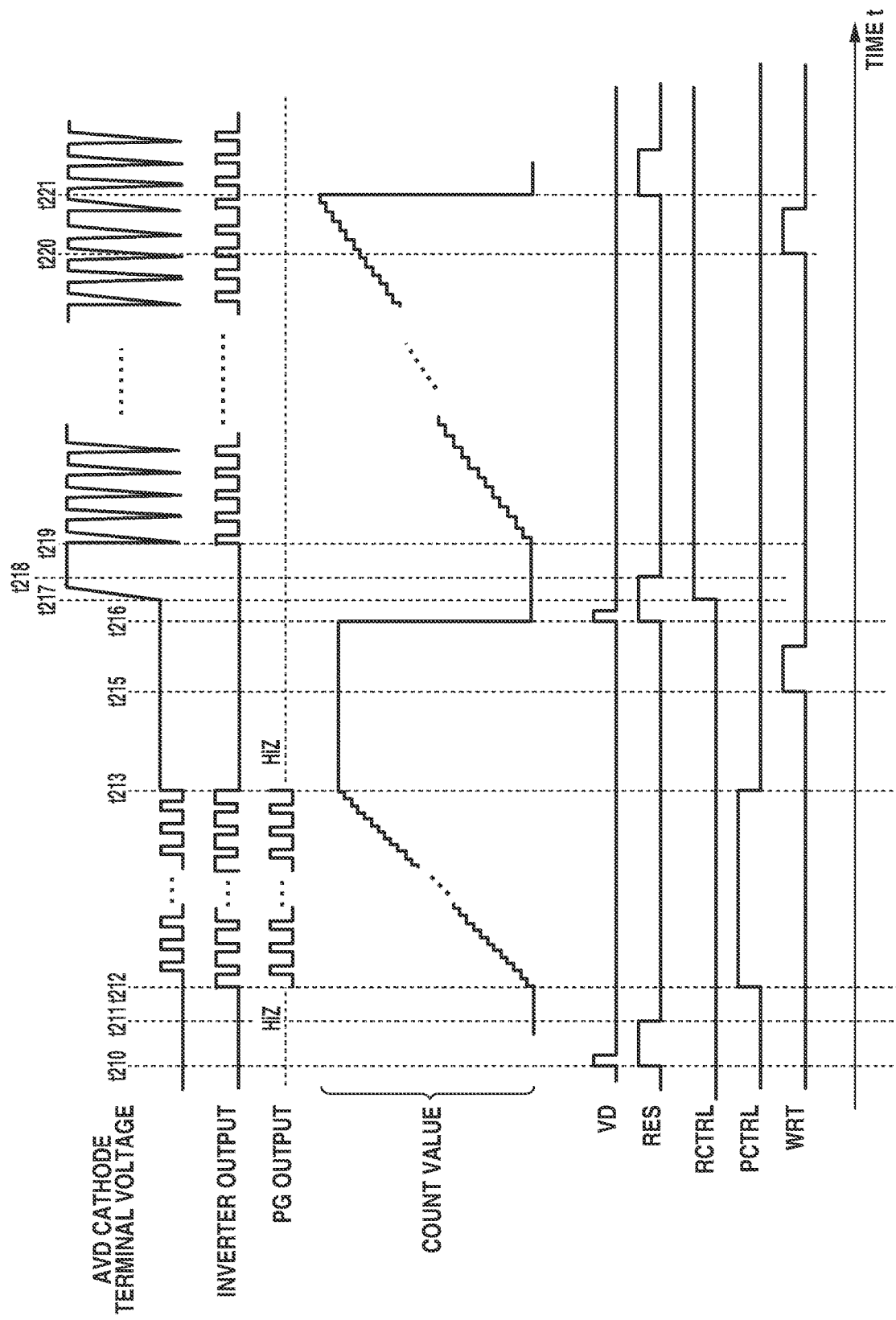
FIG. 5 is a diagram illustrating an example of operation executed by the photoelectric conversion apparatus according to the second exemplary embodiment.

An operation timing of the image capturing apparatus 100 according to the present exemplary embodiment will be described with reference to FIG. 5.

First, the operation executed in the testing mode will be described.

At time t210, each of the control signals RCTRL and PCTRL is at a low level. An output of the PG 119 is in a high impedance state (expressed as "HiZ" in FIG. 5). The other operations are similar to the operations executed at time t211 described in the first exemplary embodiment.

At time t211, the reset control signal RES is at a low level, so that the counter 114 is brought into a state where counting operation can be executed. At this time, a voltage at which the AVD 111 can be operated in a Geiger mode, e.g., 20 V, is applied to the Vbias node. However, because the control signal RCTRL is at a low level, the voltage of the Vbias node is not applied to the cathode node of the AVD 111, so that the AVD 111 is in a non-Geiger mode.

At time t212, when the control signal PCTRL is at a high level, a pulse signal (second pulse signal) is output from the PG 119. An output of the inverter 113 is changed according to the wave pulse of the second pulse signal. A count value according to the number of times of change of the output of the inverter 113 is written into the counter 114.

A period from time t212 to time t213, when the control signal PCTRL is at a high level, is a writing period in which a test count value (reference digital signal) is written into the counter 114.

At time t215, when the transfer control signal WRT is at a high level, the reference digital signal retained by the counter 114 is transferred to the corresponding pixel memory 116. Through the above-described operation, a known value can be written into the pixel memory 116 as a reference digital signal by counting the number of pulses of the second pulse signal output from the PG 119.

Next, the regular operation mode will be described.

At time t216, similar to the first exemplary embodiment, a count value of the pixel memory 116 of the pixel circuit 110 is reset.

At time t217, the control signal RCTRL is at a high level, so that the potential (20 V) of the Vbias node is applied to the cathode of the AVD 111. With this operation, the AVD 111 is shifted to a Geiger mode from a non-Geiger mode.

At time t218, the reset control signal RES is at a low level, so that the counter 114 is brought into a state where counting operation can be executed.

After time t219, similar to the first exemplary embodiment, the inverter 113 generates the first pulse signal based on the photon incident on the AVD 111. The counter 114 counts the wave pulses of the first pulse signal.

At time t220, when the transfer control signal WRT is at a high level, the transfer switch 115 is turned ON, and the count value at time t220 is written into the pixel memory 116.

Similar to the first exemplary embodiment, it is possible to test whether the pixel circuit 110 is in the normal state by comparing the reference digital signal output from the pixel circuit 110 with the expectation value through the operation executed in the testing mode.

Further, in the present exemplary embodiment, a reference pulse signal is input to the input node of the inverter 113. In the first exemplary embodiment, the potential of the Vbias node connected to the cathode of the AVD 111 is changed. The Vbias node is commonly connected thereto in each of the pixel circuits 110. Accordingly, in the first exemplary embodiment, a parasitic capacity is increased at the output node of the Vbias generation circuit 118 because Vbias nodes of the plurality of pixel circuits 110 are connected. Therefore, in the configuration according to the first exemplary embodiment, there may be a difficulty in improvement of a driving frequency of the second pulse signal.

On the other hand, according to the configuration of the present exemplary embodiment, the second pulse signal is generated by the PG 119 arranged on the pixel circuit 110. Thus, in comparison to the first exemplary embodiment, the frequency of the second pulse signal can be improved easily. With this configuration, time taken for executing testing can be shorter than in the first exemplary embodiment.

In the present exemplary embodiment, the PG 119 is arranged on each of the pixel circuits 110. However, the present exemplary embodiment is not limited to the above configuration, and a plurality of pixel circuits 110 arranged in one row or one column may share one PG 119. Further, the plurality of pixel circuits 110 may be divided into a plurality of blocks each of which has a plurality of rows or columns, and the plurality of pixel circuits 110 included in one block may share one PG 119.

Furthermore, similar to the first exemplary embodiment, in the configuration according to the present exemplary embodiment, a predetermined value of offset can also be applied to the digital signal generated in the regular operation mode.

A configuration of a third exemplary embodiment will be described mainly focusing on differences from the second exemplary embodiment.

Figure 6:
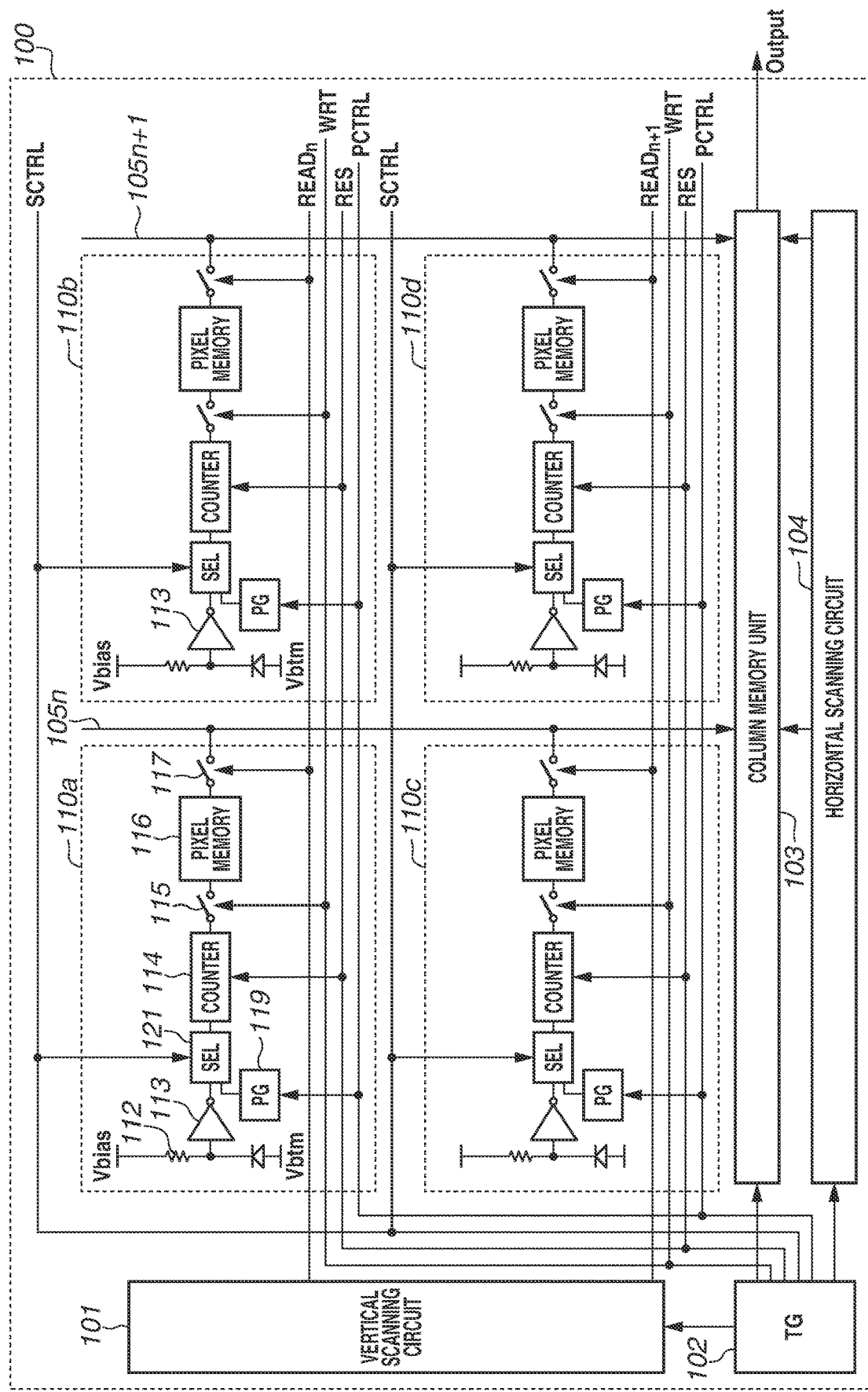
FIG. 6 is a diagram illustrating an example of a configuration of a photoelectric conversion apparatus according to a third exemplary embodiment.

FIG. 6 is a diagram illustrating a configuration of an image capturing apparatus as an example of the photoelectric conversion apparatus according to the present exemplary embodiment.

In the present exemplary embodiment, each of the pixel circuits 110 includes a selection circuit 121. In FIG. 6, the selection circuit is expressed as "SEL 121". The output node of the PG 119 is connected to an input node of the selection circuit 121. The output node of the inverter 113 is also connected to the input node of the selection circuit 121. The input node of the selection circuit 121 included in the pixel circuit 110 is connected to the TG 102. Depending on the control signal output from the TG 102, the selection circuit 121 selects any one of the output of the inverter 113 and the output of the PG 119 as a signal to be input to the counter 114.

An operation timing of the image capturing apparatus 100 according to the present exemplary embodiment will be described with reference to FIG. 7.

Figure 7:
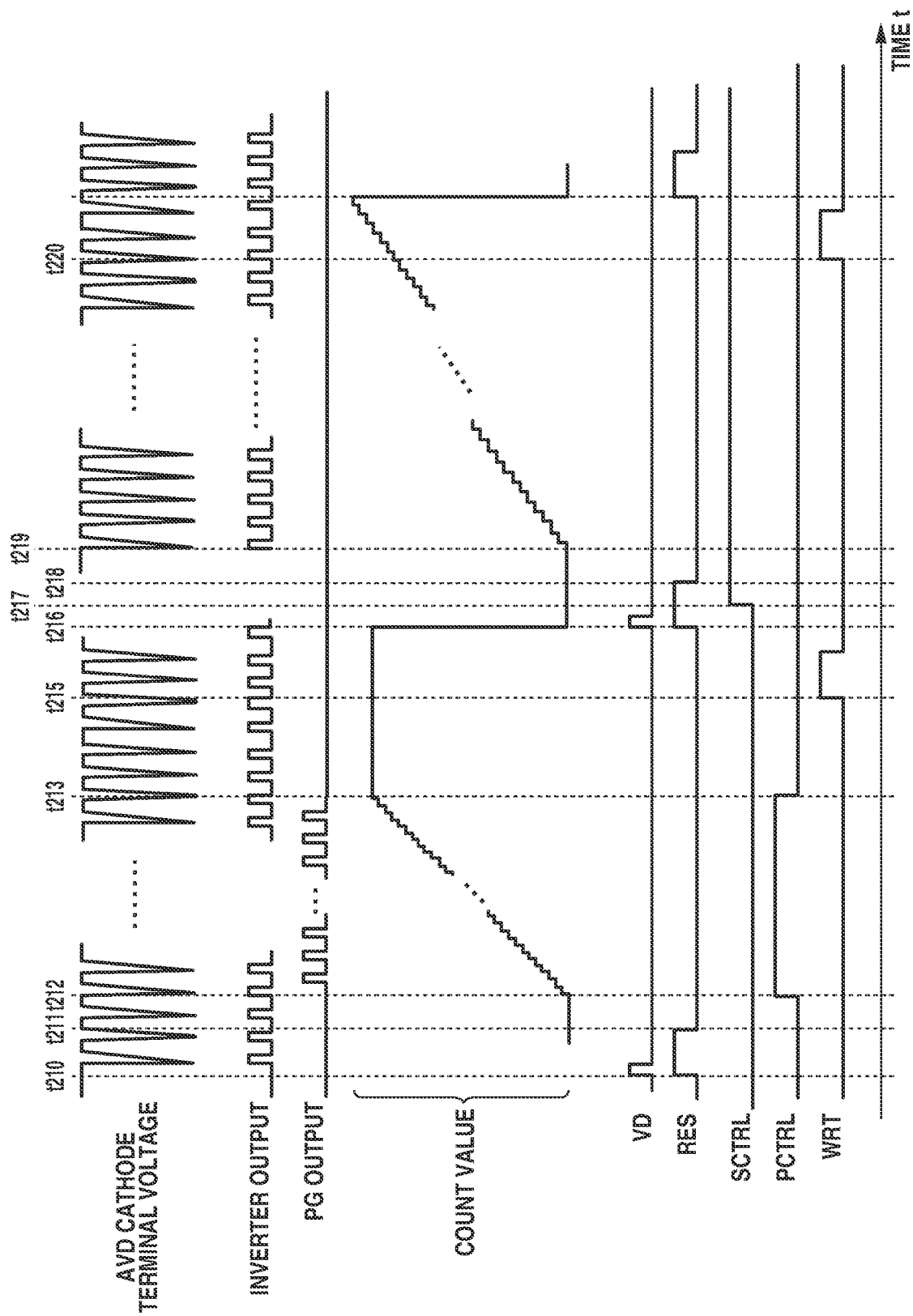
FIG. 7 is a diagram illustrating an example of operation executed by the photoelectric conversion apparatus according to the third exemplary embodiment.

A control signal SCTRL in FIG. 7 is a signal for controlling the selection circuit 121, output from the TG 102. When the control signal SCTRL is at a low level, the selection circuit 121 selects the output of the PG 119 as a signal to be input to the counter 114. On the other hand, when the control signal SCTRL is at a high level, the selection circuit 121 selects the output of the inverter 113 as a signal to be input to the counter 114.

Similar to the second exemplary embodiment, the counter 114 of the pixel circuit 110 is reset by the operation executed at time t210.

At time t211, because the control signal SCTRL is at a low level, the selection circuit 121 of the pixel circuit 110 selects the output of the PG 119 as a signal to be input to the counter 114. At this time, a voltage at which the AVD 111 is operated in a Geiger mode, e.g., 20 V, is applied to the Vbias node. That is, the AVD 111 is in a state where avalanche multiplication occurs when a photon is incident thereon. However, the selection circuit 121 selects the output of the PG 119 as a signal to be input to the counter 114. Therefore, even if the avalanche multiplication occurs in the AVD 111, change of the output of the inverter 113 is not transmitted to the counter 114.

At time t212, when the control signal PCTRL is at a high level, the reference pulse signal (second pulse signal) is output from the PG 119. As described above, the selection circuit 121 selects the output of the PG 119 as a signal to be input to the counter 114. Therefore, the reference pulse signal output from the PG 119 is input to the counter 114.

A period from time t212 to time t213, when the control signal PCTRL is at a high level, is a writing period (test signal writing period) in which a test count value (reference digital signal) is written into the counter 114.

At time t215, when the transfer control signal WRT is at a high level, the reference digital signal retained by the counter 114 is transferred to the pixel memory 116.

Through the above-described operation, a known value can be written into the pixel memory 116 as the reference digital signal by controlling the number of pulses of the reference pulse signal output from the PG 119.

Next, the regular operation mode will be described.

At time t216, similar to the second exemplary embodiment, the counter 114 of the pixel circuit 110 is reset.

At time t217, the TG 102 sets the control signal SCTRL to a High level. With this operation, the selection circuit 121 of the pixel circuit 110 selects the output of the inverter 113 as a signal to be output to the counter 114.

At time t218, the counter 114 is brought into a state where counting operation can be executed.

After time t219, similar to the second exemplary embodiment, the inverter 113 generates the first pulse signal based on a photon incident on the AVD 111. The counter 114 counts the number of the occurrences of the wave pulses of the first pulse signal.

At time t220, when the transfer control signal WRT is at a high level, the transfer switch 115 is turned ON, and the count value at time t220 is written into the pixel memory 116.

Similar to the first and the second exemplary embodiments, it is possible to test whether the pixel circuit 110 is in the normal state by comparing the reference digital signal output from the pixel circuit 110 with the expectation value through the operation executed in the testing mode.

Further, in the second exemplary embodiment, the second pulse signal is input to the counter 114 via the inverter 113. In the present exemplary embodiment, the second pulse signal can be input to the counter 114 without the inverter 113. Therefore, a parasitic capacity of the output node of the PG 119 can be reduced to be lower than in the second exemplary embodiment. As a result, in the present exemplary embodiment, a frequency of the second pulse signal can be improved more easily than in the second exemplary embodiment. Therefore, according to the configuration of the present exemplary embodiment, time taken for executing testing can be shorter than in the second exemplary embodiment.

In the present exemplary embodiment, a plurality of pixel circuits 110 can also share one PG 119, as in the second exemplary embodiment.

Further, in the present exemplary embodiment, the AVD 111 is in a Geiger mode when testing is being executed. However, the AVD 111 may be shifted to a non-Geiger mode by changing the voltage of the Vbias node or the Vbtm node. In this way, power consumption of the AVD 111 can be reduced. Further, as described in the second exemplary embodiment, by using a PMOS transistor as the quench element 112, the PMOS transistor may be turned OFF. In this way, it is also possible to prevent an avalanche multi-plication phenomenon can be prevented from repeatedly occurring at the AVD 111, so that it is possible to reduce the power consumption.

In addition, similar to the first exemplary embodiment, a predetermined value of offset can also be applied to the digital signal generated in the regular operation mode in the configuration according to the present exemplary embodiment.

Figure 8:
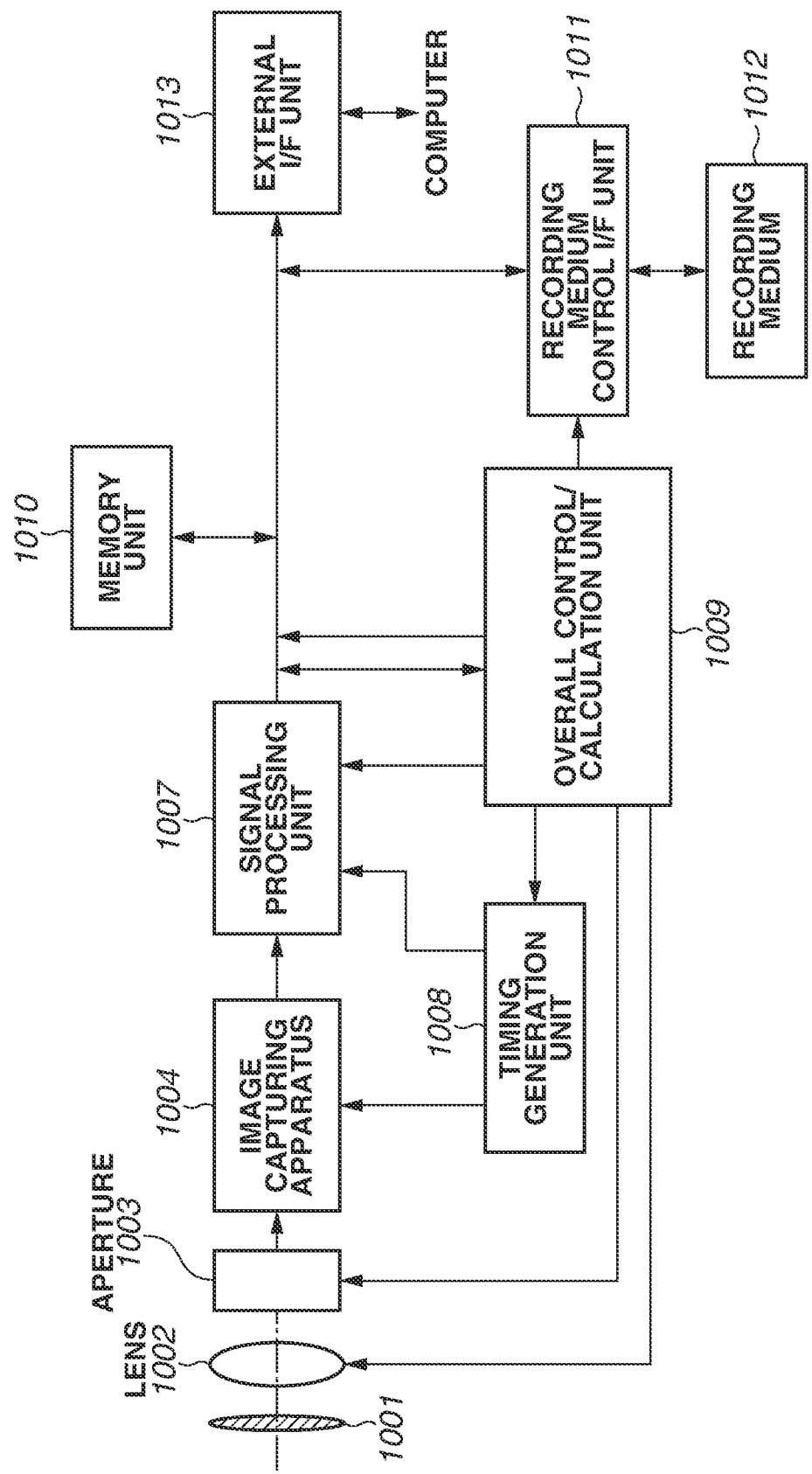
FIG. 8 is a diagram illustrating a configuration of a photoelectric conversion system according to a fourth exemplary embodiment.

A photoelectric conversion system according to a fourth exemplary embodiment will be described with reference to FIG. 8. FIG. 8 is a block diagram illustrating a schematic configuration of a photoelectric conversion system according to the present exemplary embodiment.

The photoelectric conversion apparatuses (image capturing apparatuses) described in the first to the third exemplary embodiments can be applied to various photoelectric conversion systems. A digital still camera, a digital camcorder, a monitoring camera, a copying machine, a facsimile machine, a mobile phone, a car-mounted camera, and an observation satellite are given as examples of the photoelectric conversion system to which the photoelectric conversion apparatus can be applied. Further, a camera module including an optical system, such as a lens, and an image capturing apparatus is also included in the photoelectric conversion system. A block diagram of a digital still camera, as one of the above-described examples, is illustrated in FIG. 8.

The photoelectric conversion system illustrated in FIG. 8 includes an image capturing apparatus 1004, a lens 1002 for forming an optical image of an object on the image capturing apparatus 1004, an aperture 1003 for causing an amount of light passing through the lens 1002 to be variable, and a barrier 1001 for protecting the lens 1002. The lens 1002 and the aperture 1003 are optical systems for condensing light to the image capturing apparatus 1004. The image capturing apparatus 1004 is the photoelectric conversion apparatus (image capturing apparatus) according to any one of the above-described exemplary embodiments, and the image capturing apparatus 1004 converts an optical image formed by the lens 1002 into an electric signal.

The photoelectric conversion system further includes a signal processing unit 1007 serving as an image generation unit which generates an image by processing an output signal output from the image capturing apparatus 1004. The signal processing unit 1007 executes various types of correction and compression as necessary and outputs image data. The signal processing unit 1007 may be arranged on a semiconductor substrate on which the image capturing apparatus 1004 is arranged, or may be arranged on a semiconductor substrate different from the one on which the image capturing apparatus 1004 is arranged. Further, the image capturing apparatus 1004 and the signal processing unit 1007 may be arranged on the same semiconductor substrate.

The photoelectric conversion system further includes a memory unit 1010 for temporarily storing image data and an external interface unit (external I/F unit) 1013 for communicating with an external computer. Furthermore, the photoelectric conversion system includes a recording medium 1012, such as a semiconductor memory, and a recording medium control interface unit (recording medium I/F unit) 1011. Captured image data is recorded in or read-out from the recording medium 1012, and the recording medium I/F unit 1011 executes operation for recording or reading-out the captured data in/from the recording medium 1012. In addition, the recording medium 1012 may be built into the photoelectric conversion system, or may be attachable to and detachable from the photoelectric conversion system.

Further, the photoelectric conversion system includes an overall control/calculation unit 1009 and a timing generation unit 1008. The overall control/calculation unit 1009 executes various types of calculation and controls the entirety of the digital still camera, and the timing generation unit 1008 outputs various timing signals to the image capturing apparatus 1004 and the signal processing unit 1007. Herein, the timing signal may be input thereto from the outside, so that the photoelectric conversion system only needs to include at least the image capturing apparatus 1004 and the signal processing unit 1007 that processes an output signal output from the image capturing apparatus 1004.

The image capturing apparatus 1004 outputs a captured image signal to the signal processing unit 1007. The signal processing unit 1007 executes predetermined signal processing on the captured image signal output from the image capturing apparatus 1004 and outputs image data. The signal processing unit 1007 generates an image by using the captured image signal.

As described above, according to the present exemplary embodiment, it is possible to realize a photoelectric conversion system to which the photoelectric conversion apparatus (image capturing apparatus) according to any one of the above-described exemplary embodiments is applied.

In addition, the signal processing unit 1007 can be operated as the comparison circuit according to the above-described first to the third exemplary embodiments, which compares a reference digital signal with an expectation value. Further, the overall control/calculation unit 1009 or the timing generation unit 1008 may be configured to output a clock pulse for generating the second pulse signal to the Vbias generation circuit 118 described in the first exemplary embodiment.

Figure 9A:
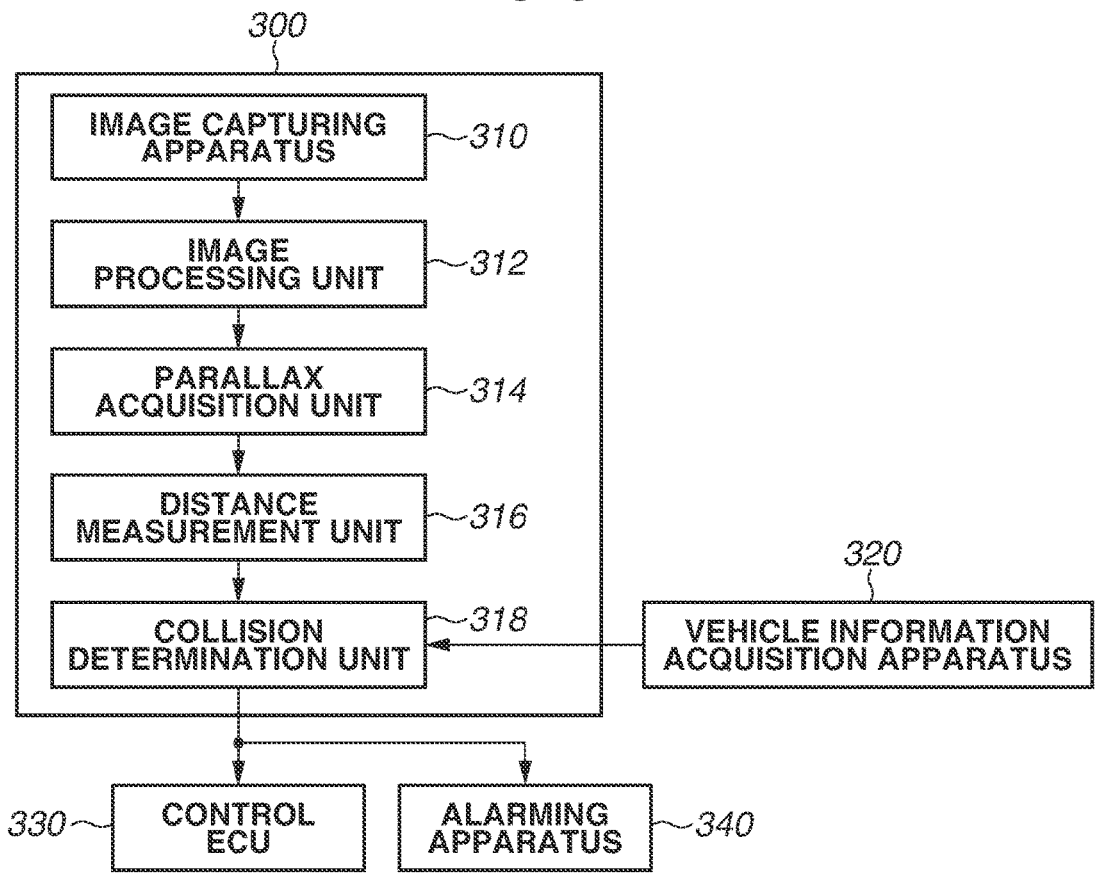
FIGS. 9A and 9B are diagrams illustrating a configuration and operation of a moving body according to a fifth exemplary embodiment.
Figure 9B:
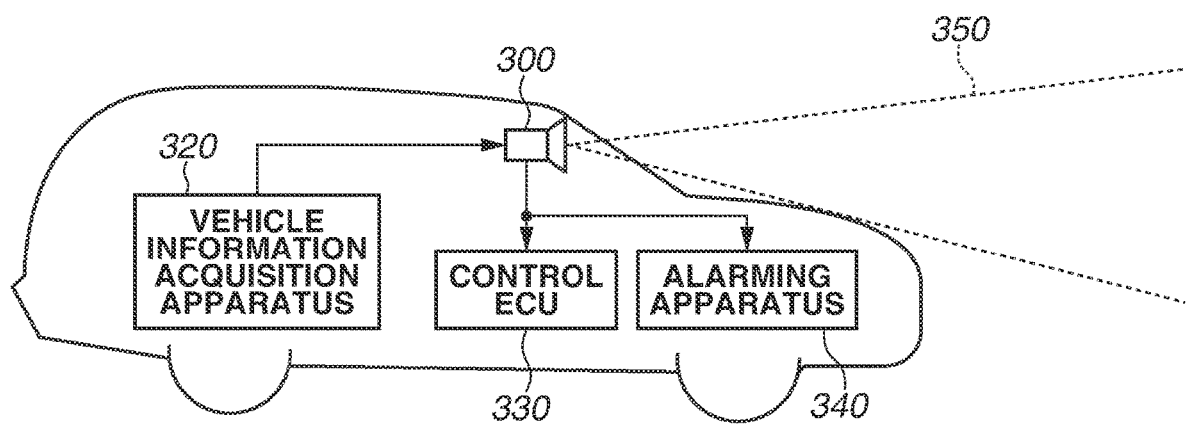

A photoelectric conversion system and a moving body according to a fifth exemplary embodiment will be described with reference to FIGS. 9A and 9B. FIGS. 9A and 9B are diagrams illustrating configurations of the photoelectric conversion system and the moving body according to the present exemplary embodiment.

FIG. 9A is a block diagram illustrating an example of a photoelectric conversion system for a car-mounted camera. A photoelectric conversion system 300 includes an image capturing apparatus 310. The image capturing apparatus 310 is the photoelectric conversion apparatus (image capturing apparatus) described in any one of the above-described exemplary embodiments. The photoelectric conversion system 300 includes an image processing unit 312 for executing image processing on a plurality of pieces of image data acquired by the image capturing apparatus 310 and a parallax acquisition unit 314 for calculating parallax (a phase difference of parallax images) from a plurality of pieces of image data acquired by the photoelectric conversion system 300. The photoelectric conversion system 300 further includes a distance measurement unit 316 for calculating a distance to a target object based on the calculated parallax and a collision determination unit 318 for determining whether there is a possibility of collision based on the calculated distance. Herein, the parallax acquisition unit 314 and the distance measurement unit 316 are examples of a distance information acquisition unit which acquires distance information indicating a distance to a target object. In other words, the distance information is information about parallax, a defocus amount, and a distance to a target object. The collision determination unit 318 may determine a possibility of collision by using any one of the above-described types of distance information. The distance information acquisition unit may be realized by exclusively-designed hardware or a software module. Further, the distance information acquisition unit may be realized by any one or combination of a field programmable gate array (FPGA) and an application specific integrated circuit (ASIC).

The photoelectric conversion system 300 is connected to a vehicle information acquisition apparatus 320, so that vehicle information, such as a vehicle speed, a yaw rate, and a rudder angle, can be acquired therefrom. Further, an electronic control unit (ECU) 330 (also referred to as "control ECU 330") is connected to the photoelectric conversion system 300. The control ECU 330 is a control device which outputs a control signal for generating a breaking force to a vehicle based on a determination result acquired by the collision determination unit 318. The photoelectric conversion system 300 is also connected to an alarming apparatus 340 that provides a warning to a driver based on a determination result acquired by the collision determination unit 318. For example, if the collision determination unit 318 determines that a possibility of collision is high, the control ECU 330 executes vehicle control to avoid a collision or to reduce damages by applying a brake, releasing a gas pedal, or suppressing an engine output. The alarming apparatus 340 provides a warning to the user by making an alarming sound, displaying alarming information on a screen of a car navigation system, or producing vibrations in a seat belt or a steering wheel.

In the present exemplary embodiment, peripheral views of a vehicle, e.g., a forward view and a backward view of a vehicle are captured by the photoelectric conversion system 300. A photoelectric conversion system for capturing a forward view (i.e., image capturing range 350) of a vehicle is illustrated in FIG. 9B. The vehicle information acquisition apparatus 320 transmits an instruction to the photoelectric conversion system 300 or the image capturing apparatus 310. Through the above-described configuration, range finding accuracy can be further improved.

In the above-described exemplary embodiment, control processing for preventing a vehicle from colliding with another vehicle has been described as an example. However, the present disclosure is also applicable to control of automatically driving a vehicle to follow after another vehicle or control of automatically driving a vehicle not to drift from a traffic lane. Further, the photoelectric conversion system can be applied not only to a vehicle such as an automobile but also to a moving body (moving apparatus), such as a ship, an airplane, or an industrial robot. The photoelectric conversion system can be also applied not only to a moving body but also to a device such as an intelligent transportation system (ITS), which widely employs an object recognition function.

Variation of Exemplary Embodiment

The present disclosure is not limited to the above-described exemplary embodiments, and many variations are possible.

For example, an example in which a part of the configuration according to any one of the above-described exemplary embodiments is added to or replaced with the configuration according to another exemplary embodiment is also included in the exemplary embodiments of the present disclosure.

Further, the photoelectric conversion systems described in the fourth and the fifth exemplary embodiments merely illustrate examples of the photoelectric conversion system to which a photoelectric conversion apparatus is applicable, and a photoelectric conversion system to which the photoelectric conversion apparatus according to any of the exemplary embodiments of the present disclosure is applicable is not limited to the configurations illustrated in FIG. 8 and FIGS. 9A and 9B.

In addition, the above-described exemplary embodiments are merely examples embodying the present disclosure, and shall not be construed as limiting the technical range of the present disclosure. In other words, the present disclosure can be realized in diverse ways without departing from the technical spirit or main features of the present disclosure.

According to the aspect of the present disclosure, testing of the photoelectric conversion apparatus can be executed desirably.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-194804, filed Oct. 25, 2019, which is hereby incorporated by reference herein in its entirety.

What is claimed is:

1. A photoelectric conversion apparatus comprising:
an avalanche diode configured to generate avalanche multiplication based on incident light;
a waveform shaping circuit configured to generate a first pulse signal based on a signal output from the avalanche diode;
a reference circuit configured to generate a second pulse signal without depending on the incident light; and
a counter connected to the waveform shaping circuit and the reference circuit to count a number of occurrences of a pulse signal,
wherein the pulse signal is based on the second pulse signal, and is input to the counter, and
wherein the reference circuit generates the second pulse signal by changing a potential of an anode of the avalanche diode or a cathode of the avalanche diode.

2. The photoelectric conversion apparatus according to claim 1, wherein a potential difference between an anode of the avalanche diode and a cathode of the avalanche diode in a period when the second pulse signal is input to the counter is smaller than a potential difference between the anode and the cathode in a period when the first pulse signal is input to the counter.

3. The photoelectric conversion apparatus according to claim 1, further comprising a selection circuit,
wherein an input node of the selection circuit is connected to the reference circuit and the waveform shaping circuit, and an output node of the selection circuit is connected to the counter.

4. The photoelectric conversion apparatus according to claim 1, wherein the reference circuit is connected to a node to which the avalanche diode and the waveform shaping circuit are connected.

5. The photoelectric conversion apparatus according to claim 1, wherein the second pulse signal is a wave pulse repeated in a single cycle.

6. The photoelectric conversion apparatus according to claim 1, wherein the reference circuit generates the second pulse signal based on a clock pulse.

7. The photoelectric conversion apparatus according to claim 6, further comprising a plurality of pixel circuits arranged in a plurality of rows and columns,
wherein each of the pixel circuits includes the avalanche diode, the waveform shaping circuit, the reference circuit, and the counter,
wherein the photoelectric conversion apparatus further comprises a control circuit configured to control the plurality of pixel circuits, and
wherein the control circuit supplies the clock pulse to the reference circuit included in each of the pixel circuits.

8. The photoelectric conversion apparatus according to claim 1, further comprising a plurality of pixel circuits arranged in a plurality of rows and columns,
wherein each of the pixel circuits includes the avalanche diode, the waveform shaping circuit, the reference circuit, and the counter.

9. The photoelectric conversion apparatus according to claim 1, wherein the counter starts counting the first pulse signal from a count value of the second pulse signal.

10. A photoelectric conversion system comprising:
the photoelectric conversion apparatus according to claim 1; and
a signal processing unit configured to generate an image by using a signal output from the photoelectric conversion apparatus.

11. A moving body including the photoelectric conversion apparatus according to claim 1, the moving body comprising:
a control unit configured to control movement of the moving body by using a signal output from the photoelectric conversion apparatus.

12. A photoelectric conversion apparatus comprising:
an avalanche diode configured to generate avalanche multiplication based on incident light;
a waveform shaping circuit configured to generate a first pulse signal based on a signal output from the avalanche diode;
a reference circuit configured to generate a second pulse signal without depending on the incident light; and
a counter configured to count the first pulse signal and the second pulse signal,
wherein the reference circuit generates the second pulse signal by changing a potential of an anode of the avalanche diode or a cathode of the avalanche diode.

13. The photoelectric conversion apparatus according to claim 12, wherein a potential difference between an anode of the avalanche diode and a cathode of the avalanche diode in a period when the second pulse signal is input to the counter is smaller than a potential difference between the anode and the cathode in a period when the first pulse signal is input to the counter.

14. The photoelectric conversion apparatus according to claim 12, further comprising a selection circuit,
wherein an input node of the selection circuit is connected to the reference circuit and the waveform shaping circuit, and an output node of the selection circuit is connected to the counter.

15. The photoelectric conversion apparatus according to claim 12, wherein the reference circuit is connected to a node to which the avalanche diode and the waveform shaping circuit are connected.

16. The photoelectric conversion apparatus according to claim 12, wherein the second pulse signal is a wave pulse repeated in a single cycle.

17. The photoelectric conversion apparatus according to claim 12, wherein the reference circuit generates the second pulse signal based on a clock pulse.

18. A photoelectric conversion apparatus comprising:
an avalanche diode configured to generate avalanche multiplication based on incident light;
a waveform shaping circuit configured to generate a first pulse signal based on a signal output from the avalanche diode;
a reference circuit configured to generate a second pulse signal without depending on the incident light; and
a counter connected to the waveform shaping circuit and the reference circuit to count a number of occurrences of a pulse signal,
wherein the pulse signal based on the second pulse signal is input to the counter, and a potential difference between an anode of the avalanche diode and a cathode of the avalanche diode in a period when the second pulse signal is input to the counter is smaller than a potential difference between the anode and the cathode in a period when the first pulse signal is input to the counter.

19. A photoelectric conversion apparatus comprising:
an avalanche diode configured to generate avalanche multiplication based on incident light;
a waveform shaping circuit configured to generate a first pulse signal based on a signal output from the avalanche diode;
a reference circuit configured to generate a second pulse signal without depending on the incident light; and
a counter configured to count the first pulse signal and the second pulse signal,
wherein a potential difference between an anode of the avalanche diode and a cathode of the avalanche diode in a period when the second pulse signal is input to the counter is smaller than a potential difference between the anode and the cathode in a period when the first pulse signal is input to the counter.

* * * * *